United States Patent
Aras et al.

(10) Patent No.: US 10,140,282 B2
(45) Date of Patent: Nov. 27, 2018

(54) INPUT STRING MATCHING FOR DOMAIN NAMES

(71) Applicant: VERISIGN, INC., Reston, VA (US)

(72) Inventors: Pallavi Aras, Ashburn, VA (US); Ronald Andrew Hoskinson, Oak Hill, VA (US)

(73) Assignee: VERISIGN, INC., Reston, VA (US)

( * ) Notice: Subject to any disclaimer, the term of this patent is extended or adjusted under 35 U.S.C. 154(b) by 507 days.

(21) Appl. No.: 14/242,190

(22) Filed: Apr. 1, 2014

(65) Prior Publication Data

US 2015/0278188 A1 Oct. 1, 2015

(51) Int. Cl.
*G06F 17/27* (2006.01)
*G06F 17/30* (2006.01)
*H04L 29/12* (2006.01)

(52) U.S. Cl.
CPC ...... *G06F 17/271* (2013.01); *G06F 17/30876* (2013.01); *H04L 61/3025* (2013.01)

(58) Field of Classification Search
CPC . G06F 17/271; H04L 61/1511; H04L 61/6004
USPC ........................................................ 709/245
See application file for complete search history.

(56) References Cited

U.S. PATENT DOCUMENTS

| | | | |
|---|---|---|---|
| 6,314,469 B1 | 11/2001 | Tan et al. | |
| 7,020,602 B1 | 3/2006 | Kim et al. | |
| 8,869,019 B1* | 10/2014 | Sampath-Kumar | G06F 17/3089 715/208 |
| 2001/0047429 A1 | 11/2001 | Seng et al. | |
| 2002/0040293 A1 | 4/2002 | Lee | |
| 2002/0083029 A1 | 6/2002 | Chun et al. | |
| 2003/0191647 A1 | 10/2003 | Kam | |
| 2004/0044791 A1 | 3/2004 | Pouzzner | |
| 2009/0043720 A1* | 2/2009 | Reznik | G06F 17/30861 706/20 |
| 2010/0114879 A1* | 5/2010 | Zhong | G06F 17/278 707/723 |
| 2012/0254317 A1 | 10/2012 | Bayles et al. | |
| 2012/0330990 A1 | 12/2012 | Chen et al. | |

(Continued)

FOREIGN PATENT DOCUMENTS

| | | |
|---|---|---|
| WO | 1999019814 A1 | 4/1999 |
| WO | 2001059605 A1 | 8/2001 |
| WO | 2010125560 A1 | 11/2010 |

OTHER PUBLICATIONS

Pirkola et al., "Fuzzy Translation of Cross-Lingual Spelling Variants," SIGIR'03, Jul. 28-Aug. 1, 2003, Toronto, Canada, 8 pages.

(Continued)

*Primary Examiner* — Suraj M Joshi
(74) *Attorney, Agent, or Firm* — MH2 Technology Law Group, LLP

(57) ABSTRACT

A plurality of input string n-grams may be generated by accessing an input string and generating a Universal character set transformation format (UTF) encoded input string from the input string. The UTF encoded input string may be parsed via an n-gram parser to generate a plurality of input string n-grams, where a length of each of the input string n-grams is larger than a lower bound and smaller than an upper bound. The generated plurality of input string n-grams may be provided to determine matches between the input string and a domain.

26 Claims, 10 Drawing Sheets

(56) References Cited

U.S. PATENT DOCUMENTS

2014/0100845 A1\* 4/2014 Hoskinson .......... H04L 61/3035
704/8
2014/0164352 A1\* 6/2014 Denninghoff ...... H03H 9/02622
707/711

OTHER PUBLICATIONS

Hussain et al., "Urdu Domain Names," Multitopic Conference, 2006, INMIC '06, IEEE, 13 pages.
Extended European Search Report dated May 27, 2015, European Application No. 15162288.3 filed Apr. 1, 2015, pp. 1-8.
Communication Pursuant to Article 94(3) EPC dated Feb. 21, 2018, European Application No. 15162288.3, pp. 1-10.

\* cited by examiner

*Pseudocode*:
- Function IndexDomainName([Input String], [Stopword List], [Lower bound], [Upper bound], [N-gram Index])
    o Strip TLD from [Input String]
    o If [Input String] is punycode:
        ▪ Convert to UTF-8
    o If [Input String] is in [Stopword List]:
        ▪ Add [Input String] to [N-gram Index]
        ▪ Exit function
    o Else:
        ▪ If Len([Input String]) < [Lower bound]:
            • Add [Input String] to [N-gram Index]
            • Exit function
        ▪ Else:
            • If Len([Input String]) <= [Upper bound]:
                o [Upper bound] = Len([Input String])
            • Else:
                o Add [Input String] to [N-gram Index]
            • Index n-grams for [Input String] from [Lower bound] to [Upper bound]:
                o For each n-gram:
                    ▪ If n-gram does not contain a "-":
                        • Add n-gram to [N-gram Index]
            • Index prefixes and suffixes for [Input String] where ([lower bound] - 1):
                o Prefix: Add SubString(1, [lower bound] - 1) to [N-gram Index]
                o Suffix: Add SubString(Len([Input String]) - ([lower bound] - 1), Len([Input String])) to [N- gram Index]
            • Split [Input String] using "-" as delimiter:
                o For each substring:
                    ▪ If not already in [N-gram Index]:
                        • Add substring to [N-gram Index]
            • If [Input String] not already in [N-gram Index]:
                o Add [Input String] to [N-gram Index]
            • Exit function
    o Exit function
Exit function

FIG. 5

INPUT STRING MATCHING FOR DOMAIN NAMES

BACKGROUND

The Internet enables a user of a client computer system to identify and communicate with millions of other computer systems located around the world. A client computer system can identify each of these other computer systems using a unique numeric identifier for that computer called an "IP address." When a communication is sent from a client computer system to a destination computer system, the client computer system typically specifies the IP address of the destination computer system in order to facilitate the muting of the communication to the destination computer system. For example, when a request for a World Wide Web page ("Web page") is sent from a client computer system to a Web server computer system ("Web server") from which that Web page can be obtained, the client computer system typically includes the IP address of the Web server.

In order to make the identification of destination computer systems more mnemonic, a Domain Name System (DNS) has been developed that translates a unique alphanumeric name for a destination computer system into the IP address for that computer. The alphanumeric name is called a "domain name." For example, the domain name for a hypothetical computer system operated by Example Corporation may be "comp23.example.com". Using domain names, a user attempting to communicate with this computer system could specify a destination of "comp23.example.com" rather than the particular IP address of the computer system (e.g., 198.81.209.25). Domain names may include character sets such as upper and lower-case letters a-z and digits 0-9. Internationalized Domain Names (IDN) are domain names that include characters used in the local representation of languages that are not written with the twenty-six letters of the basic Latin alphabet "a-z". An IDN can contain Latin letters with diacritical marks, as required by many European languages, or may include characters from non-Latin scripts such as Arabic or Chinese. Many languages also use other types of digits than the European "0-9". The basic Latin alphabet together with the European-Arabic digits are, for the purpose of domain names, termed "ASCII characters" (ASCII=American Standard Code for Information Interchange). These are also included in the broader range of "Unicode characters" that provides the basis for IDNs.

BRIEF DESCRIPTION OF THE DRAWINGS

The accompanying drawings, which are incorporated in and constitute a part of this specification, illustrate, together with the description, examples of the present disclosure. In the figures:

FIG. 5 depicts example pseudocode to generate an n-gram set, in accordance with one or more examples as discussed herein;

DETAILED DESCRIPTION

Figure 1:
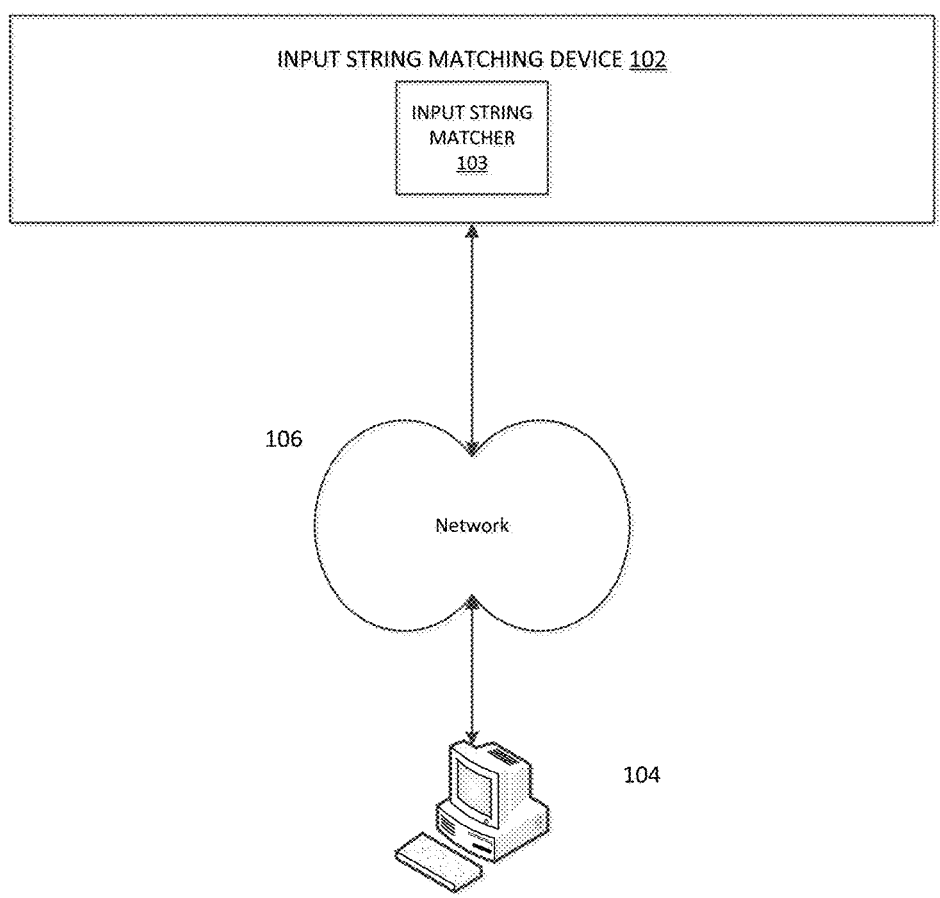
FIG. 1 is an example system environment for input string matching of domains, in accordance with one or more examples disclosed herein.

With the introduction and increasing use of internationalized domain names (IDNs), registrants may encounter new challenges when registering a domain name. For example, in scripts that are new to the Internet Naming space, but used by a large population of users (i.e., Chinese, Cyrillic, Hangul, Arabic, etc.), a user may generate a domain name request utilizing one or more graphemes that, although they may visually appear to be the same, are not exactly the same as the one or more graphemes in a registered domain name. This may result in a request for a non-existent domain (NXD). NXD data, including the domain name request, may be stored in a storage for analysis.

DNS Registry operators are interested in Identifying domain names that match keywords for multiple reasons, Including NXD monitoring, drop catch notification, trademark monitoring and searching IDNs. While there are existing matching algorithms to conduct natural language searches, the existing matching algorithms may be deficient when conducting multilingual keyword matching with domain names across natural languages.

As discussed herein, a multilingual keyword matching service may be performed with domain names across natural languages. The multilingual, or language-independent, keyword matching service may assist in identifying variants of domain names across natural languages. Given Universal character set transformation format encoded keywords, for example, 8-bit (UTF8)-encoded keywords, in any language, the keyword matching service may return a plurality of highly relevant domain names across multiple TLDs matching a set of input keywords. The keywords can comprise keywords in a single natural language, or can include a mix of different natural languages.

The keyword matching service can operate synchronously or asynchronously, and can be tuned to provide responses at varying degrees of verbosity. The keyword matching algorithm may generally be implemented as a substring search. The keyword matching may incorporate a controlled vocabulary including a stopword list.

The processes discussed herein may utilize an in-memory n-gram index for fast lookups. This system features an indexing process that balances the need for a high degree of precision and recall across multiple languages while at the same time keeping index size to a manageable level. The process may include creating an inverted n-gram index, or a plurality of n-grams, given a set of domain names where n equals a range from a lower bound to an upper bound. These bounds are configurable on a per-language basis, and may be tuned to best meet the precision and recall goals of a given language. For example, in languages with a large number of more expressive characters (such as some Asian languages), the system may have a smaller lower bound than with most Latin-based languages. By comparing the n-grams created from the keywords with n-grams created from the domains, domains that match the keywords may be identified.

As discussed herein, an input string may be accessed where the input string includes a keyword to be compared to one or more domains. A UTF-encoded input string may be generated from the input string. The UTF-encoded input string may be parsed via an n-gram parser to generate a plurality, for example, a list, of input string n-grams. A domain to be compared may be accessed and a UTF-encoded domain string may be generated from the accessed domain. The UTF-encoded domain string may be parsed to generate a plurality of domain string n-grams from the UTF-encoded domain string. The plurality of input string n-grams may be compared to the plurality of domain string n-grams. When one or more n-grams in the plurality of input string n-grams match one or more n-grams in the plurality of domain string n-grams, this may indicate that the input string matches the domain.

According to some examples, a relevance score may be generated for each of the identified matches. The relevance score may be calculated based on the number of input string n-grams that match the domain string n-grams in order to provide an indication of the degree of relevance of the match. A higher relevance score may indicate that a match of the domain is closer to the input string where a lower relevance score may indicate that a match of the domain is not as close to the input string.

As further discussed herein, a plurality of input string n-grams may be generated by accessing an input string and generating a UTF-encoded input string from the input string. The UTF-encoded input string may be parsed via an n-gram parser. A plurality of input string n-grams may be generated, where a length of each of the input string n-grams is based on a lower bound and upper bound. The generated plurality of Input string n-grams may be provided to determine matches between the plurality of input string n-grams with plurality of n-grams generated from domains.

According to some examples, a domain name input stream may be received where the domain name input stream includes a plurality of domain names. For each domain name in the domain name input stream, a UTF-encoded domain string may be generated and parsed to generate a plurality of domain string n-grams from the UTF-encoded domain string. A plurality of input string n-grams generated from a UTF-encoded input string may be accessed. The plurality of n-grams from the UTF-encoded input string may be compared to the plurality of n-grams of each of the UTF-encoded domain strings. Matches between the input string and domain names may be identified based on the comparison of the input string n-grams and the domain string n-grams. An alert may be generated including the matches of the input string and the domain names.

The matches of the input string and the domain names may indicate variants of the domain names. By determining variants of a domain name, a registrant of a domain name may have the opportunity to register variants of a domain name. This may ensure that other users access the intended registered domain, even if the domain name a user is trying to access includes one or more graphemes that are different from the graphemes in the registered domain name.

While the examples discussed herein are made with respect to UTF-8 encoding, it may be appreciated that other UTF encoding may be utilized, for example, UTF-16, UTF-32, or any other encoding that supports UTF.

FIG. 1 depicts an example system environment implementing features consistent with one or more examples discussed herein. It may be appreciated that additional elements may be included in system environment 100 and some of the elements may be removed and/or modified without departing from the spirit and scope of this disclosure.

As shown in FIG. 1, system environment 100 may include apparatus or input string matching device 102 including Input string matcher 103 for determining whether one or more input strings match one or more domains. Device 102 may be communicably Inked to apparatus or device 104 through network 106. Device 104 may be implemented as a client computing device, an administrative computing device, etc. Domain name variants generated at device 102 may be provided to device 104 through network 106.

Device 102 may be implemented as a server, a mainframe computer, any combination of these components, or any other appropriate computing device or resource service, for example, a cloud, etc. Device 102 may be standalone, or may be part of a subsystem, which may, in turn, be part of a larger system. It may be appreciated that, while device 102 may be described as including various components, one or more of the components may be located at other devices (not shown) within system environment 100.

Client device 104 may be implemented as any computing device, for example, a desktop computer, laptop computer, portable computing device, etc. Client device 104 may enable communication with device 102, enable providing Input strings for matching, and receive indications of matches of input strings with domains, among other things as described herein.

Additionally, each of devices 102 and 104 includes the necessary hardware and/or software needed to communicate with the network 106 via a wired and/or a wireless connection. Device 102 and 104 may be embodied by a server computing device, desktop/laptop/handheld computers, wireless communication devices, personal digital assistants or any other similar devices having the necessary processing and communication capabilities. In an embodiment, the network 106 may comprise a public communication network such as the Internet or World Wide Web and/or a private communication network such as a local area network (LAN), wide area network (WAN), etc.

One or both of devices 102 and 104, which may comprise one or more suitable computing devices, implement the functionality as discussed herein.

As discussed herein, devices 102 and 104 include one or more processors in communication with one or more storage devices. The processor(s) may comprise a microprocessor, microcontroller, digital signal processor, co-processor or other similar devices known to those having ordinary skill in the art. In addition, the storage device(s) as discussed herein may comprise a combination of non-transitory, volatile or nonvolatile memory such as random access memory (RAM) or read only memory (ROM). Such storage devices may be embodied using any currently known media such as magnetic or optical storage media including removable media such as floppy disks, compact discs, etc. One or more storage devices has stored thereon instructions that may be executed by the one or more processors, such that the processor(s) implement the functionality described herein. In addition, or alternatively, some or all of the software-implemented functionality of the processor(s) may be implemented using firmware and/or hardware devices such as application specific Integrated circuits (ASICs), programmable logic arrays, state machines, etc.

Figure 2:
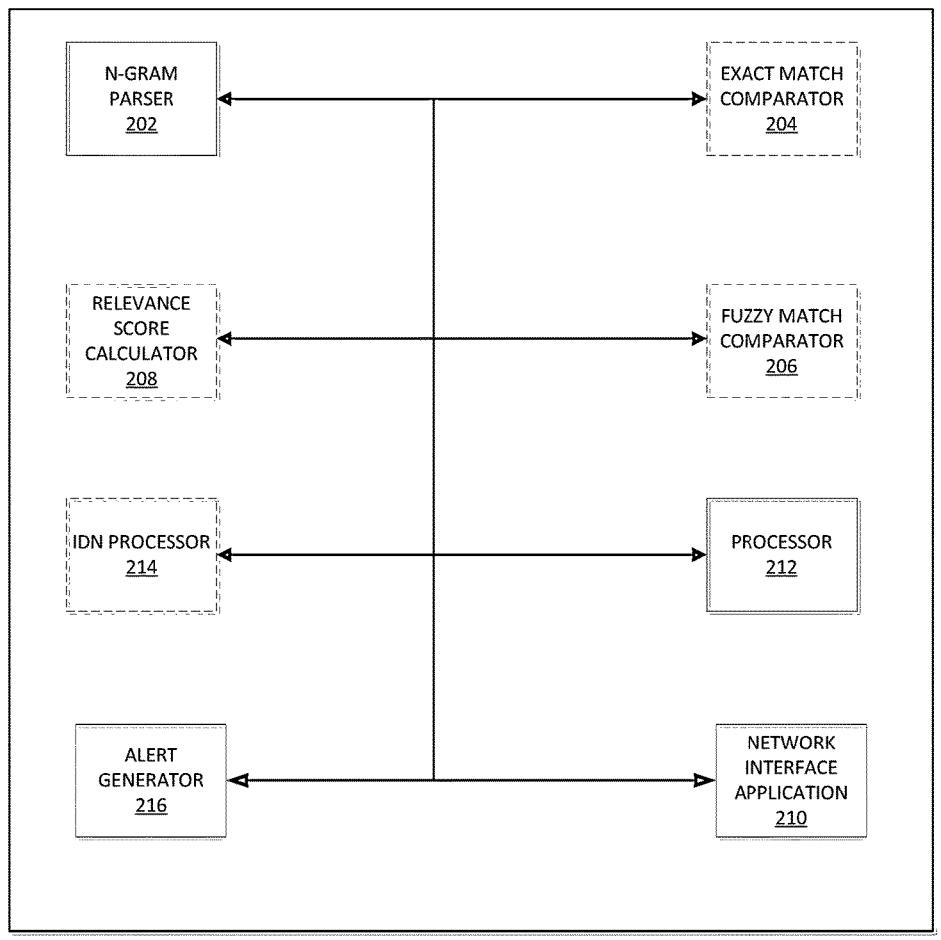
FIG. 2 is an example block diagram of components included in a device for input string matching of domains, in accordance with one or more examples disclosed herein.

FIG. 2 depicts an example configuration of input string matching device 102 depicted in FIG. 1. Input string matching device 200 may identify matches between input strings and domains. As shown in FIG. 2, device 200 may include n-gram parser 202, exact match comparator 204, fuzzy match comparator 206, relevance score calculator 208, network interface application 210, processor 212, IDN processor 214, and alert generator 216. As indicated by the dashed lines in FIG. 2, at least exact match generator 204, fuzzy match generator 206, IDN processor 214, and relevance score calculator 208 may be optionally provided.

N-gram parser 202 may be utilized by one or more of the exact match comparator 204 and the fuzzy match comparator 206 to generate a plurality of n-grams for a given input. N-gram parser 202 may generate a plurality of n-grams for Unicode strings. The n-gram parser 202 may utilize a lower and upper bound for n, for example, based on a particular Unicode range Including a first character of the string. According to some examples, the Unicode range may be determined based on a specific language. Thus, the system may utilize different lower and upper bounds for different languages.

According to some examples, the entire string may be added to the plurality of n-grams, as an n-gram, when the string length is less than the lower indexing bound or when the string is an exact match with a stop word from a pre-configured stop word list.

According to some examples, the n-gram parser 202 may add prefixes and/or suffixes of the input strings to the plurality of n-grams. The length of the prefix and/or suffix of an Input string may be equal to, for example, the lower-bound-m, where m is an integer, for example, 1, etc.

According to some examples, n-gram parser 202 may parse a string to add to the plurality of n-grams using the "-" character as a delimiter, regardless of the value of the lower or upper bound of n. Here, the string of characters, for example, all of the characters, before the "-" and the string of characters, for example, all of the characters, after the "-" may be added to the plurality of n-grams.

According to some examples, the n-gram parser 202 may add the entire string to the plurality of n-grams regardless of the value of the lower or upper bound of n.

Exact match comparator 204 may compare n-grams generated from input strings with n-grams generated from domains in order to identify exact matches. According to some examples, the exact match comparator 204 may compare ASCII and punycode IDNs with input strings, or keywords, comprising Unicode strings of different encoding, including for example UTF-encoded, by comparing n-grams generated therefrom. According to some examples, the exact match comparator 204 may utilize n-grams of a length that is bounded by a lower bound and an upper bound based on a particular Unicode range. If matches between one or more input string n-grams and domain string n-grams are found, matches between the input string and the domains may be identified. According to some examples, matches between the input string and the domains may be based on a relevance score generated by relevance score calculator 208 discussed below.

Fuzzy match comparator 206 may compare n-grams generated from input strings with n-grams from domains in order to identify fuzzy (non-exact) matches. Fuzzy matches may be based on, a comparison between n-grams utilizing, for example, an edit distance calculation, or other suitable calculations. According to some examples, the fuzzy match comparator 206 may compare ASCII and punycode IDNs to keywords comprising Unicode strings of different encoding, including for example UTF-8, by comparing n-grams generated therefrom. According to some examples, the fuzzy match generator may utilize n-grams of a length that is bounded by a lower bound and an upper bound based on a particular Unicode range. If matches between one or more input string n-grams and domain string n-grams are found, matches between the input string and the domains may be identified. According to some examples, matches between the input string and the domains may be based on a relevance score generated by relevance score calculator 208 discussed below.

Relevance score calculator 208 may calculate a relevance score for use by, for example, by the exact match comparator 204. The relevance score may be the sum of the number of input string n-grams matched with domain n-grams and a similarity score, for example, a dice coefficient similarity score between the domain n-grams and input string n-grams.

Network interface application 210 facilitates network communication between device 102 and device 104.

Processor 212 may execute computer-readable instructions, stored in storage (not shown in FIG. 2), to perform functionality as described herein.

IDN processor 214 may be used by the n-gram parser 202 to convert, where needed, input strings of type ASCII, punycode, or Unicode to a normalized UTF-8 form. According to some examples, IDN processor 214 may strip out any top-level domain suffix.

According to some examples, device 200 may include data storage (not shown) to store domain information for use within device 200. As discussed herein, domain information relating to domains may include non-existent domain (NXD) data, registered domain name information, pending domain names that are to be deleted, or de-registered, registered domain name Information from one or more Top-Level Domains, registered domain name Information from one or more WHOIS databases, registered domain data from Trademark Clearing House Data, etc. NXD data may include domain names that were included in requests generated by users at client devices, where the domain name in the request resulted in a non-existent domain name.

According to some examples, device 200 may include a storage (not shown), to store input strings for use within device 200. As discussed herein, input strings may Include one or more keywords, one or more trademarks, one or more domains, one or more domain names, etc. According to some examples, the storage storing input strings may be the same, or different than the storage storing domain information.

Alert generator 216 may generate one or more alerts Including information generated by device 200. According to some examples, alert generator 218 may generate an alert including input string n-grams. According to some examples, alert generator 216 may generate an alert including one or more domains that match one or more input strings. According to some examples, alert generator may generate an alert including one or more domains that match one or more input strings together with a relevance score indicating a relevance of one or more of the domains. The alert generated by alert generator 216 may be output to an output device (not shown) of device 200, may be stored in a local storage, or may be transmitted to a device remote from device 200, for example, a client device, an administrative device, a storage device, etc.

Figure 3:
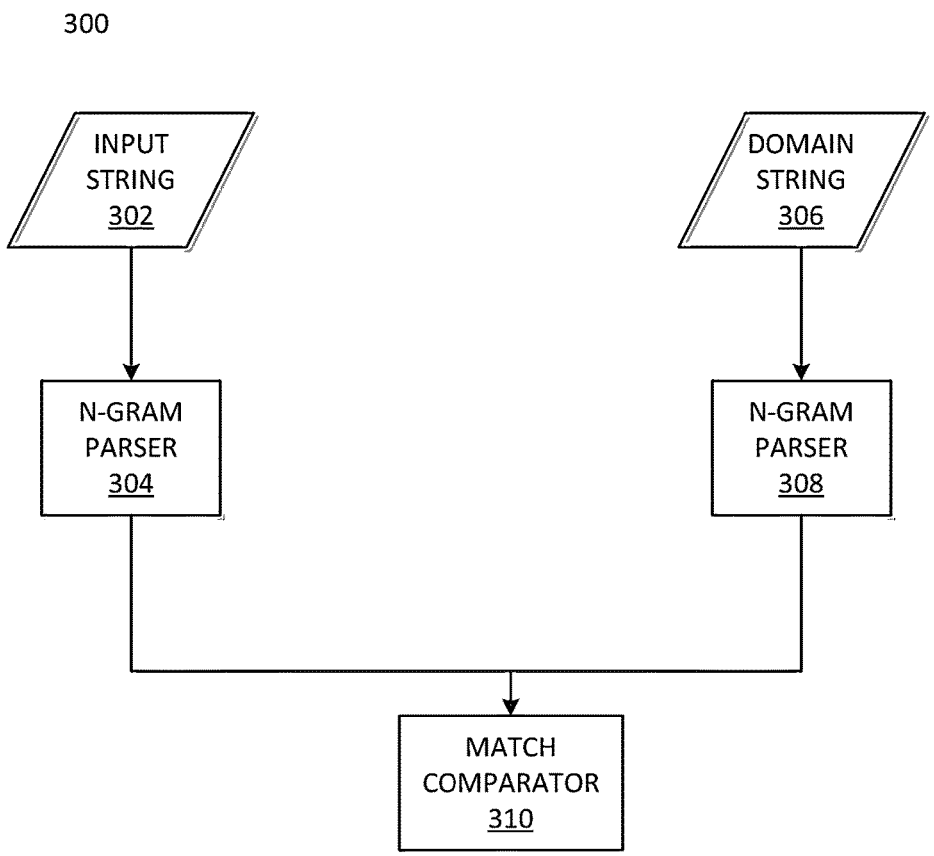
FIG. 3 is an example of a system and process for generating a set of matches of input strings and domains, in accordance with one or more examples disclosed herein.

FIG. 3 depicts an example process 300 for comparing input strings with domain strings. Process 300 may be performed, for example, by device 200. As shown in FIG. 3, an input string 302 may be passed to n-gram parser 304. The input string may be one or more input strings in a UTF-8 format. N-gram parser 304 may parse the input string to generate a plurality of input string n-grams. The n-gram parser 304 may be generate n-grams of a length of n, n being an integer ranging from a preselected lower bound to an upper bound that is equal to the length of the input string. According to some examples, the lower and upper bound for n may be based on a Unicode range of a first character of the input string.

According to some examples, the entire string may be used as an n-gram when the sting length is less than the lower bound or when the string is an exact match with a stop word from a pre-configured stop word list.

According to some examples, the n-gram parser 304 may add prefixes and/or suffixes of the input string to the plurality of n-grams. The length of the prefix and/or suffix of an input string may be of a length equal to the lowerbound −1.

According to some examples, n-gram parser 304 may parse the input string to produce n-grams to add to the plurality of n-grams by using the "-" character as a delimiter regardless of the value of the lower or upper bound of n.

According to some examples, the n-gram parser 304 may add the entire input string to the plurality of n-grams regardless of the value of the lower or upper bound of n.

Domain string 306 may be passed to n-gram parser 308. The domain string may be one or more domain strings in a UTF-8 format. N-gram parser 308 may parse the domain string to generate a plurality of domain string n-grams. The n-gram parser 308 may be generate n-grams of a length of n, n being an integer ranging from a lower bound to an upper bound equal to the length of the input string. According to some examples, the lower and upper bound for n may be based on a Unicode range of a first character of the domain string.

According to some examples, the entire string may be added to the plurality of n-grams as an n-gram when the string length is less than the lower indexing bound or when the string is an exact match with a stop word from a pre-configured stop word list.

According to some examples, the n-gram parser 308 may add prefixes and/or suffixes of the domain string to the plurality of n-grams. The length of the prefix and/or suffix of the domain string may be equal to the lowerbound −1.

According to some examples, n-gram parser 308 may parse the domain string to produce n-grams to add to the plurality of n-grams using the "-" character as a delimiter regardless of the value of the lower or upper bound of n.

According to some examples, the n-gram parser 384 may add the entire Input string to the plurality of n-grams regardless of the value of the lower or upper bound of n.

The plurality of input string n-grams and the plurality of domain string n-gram may be passed to match comparator 310 to identify matches. Match comparator 310 may utilize exact match comparator 204 and/or fuzzy match comparator 206 as discussed with regard to FIG. 2.

Match comparator 310 outputs matches between the input string and the domain string based on matches between the plurality of input string n-grams and the plurality of domain string n-grams. According to some examples, a match may be determined if one or more input string n-grams matches one or more domain string n-grams.

According to some examples, the matches may be analyzed to calculate a relevance score, via relevance score calculator 208. The relevance score may be based on keyword and Input string n-gram matches with domain string n-gram matches. The relevance score may be the sum of the number of input string n-grams matched with domain string n-grams and a similarity score, for example, a dice coefficient similarity score between the domain string n-grams and input string n-grams. The relevance scores may be associated with the respective matches and output. According to some examples, a minimum threshold value for the relevance score may be predefined, where only matches having a score at or above the predefined minimum threshold may be output.

According to some examples, an alert may be generated, for example, by alert generator 216, the alert including the matches between the input strings and the domains and may be passed, for example, to an output device, to a remote device, etc. An alert may be generated when one or more matches is found between an input string and a domain string.

Figure 4:
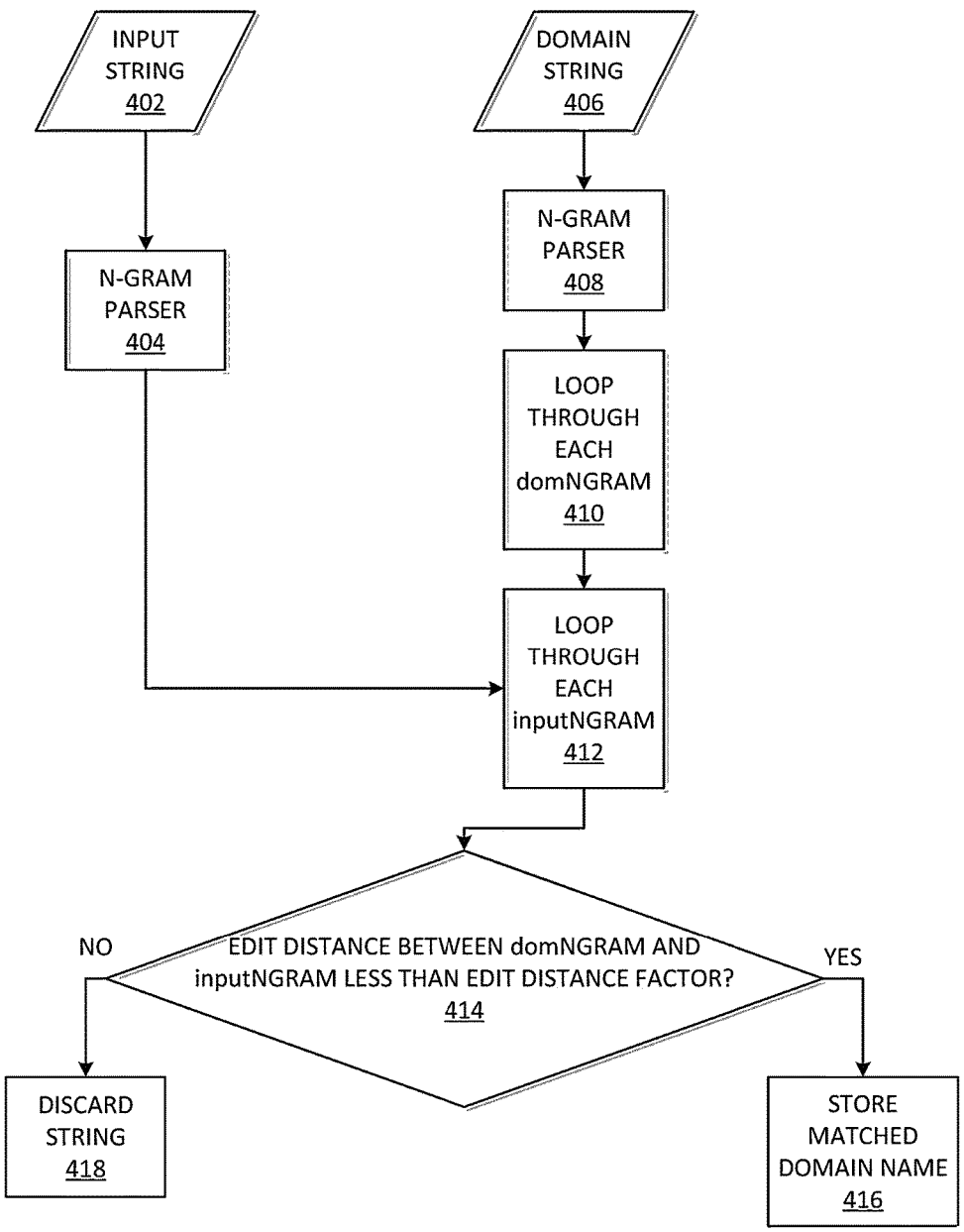
FIG. 4 is an example flow diagram of a process for generating a set of fuzzy matches, in accordance with one or more examples disclosed herein.

FIG. 4 depicts an example process 400 for generating a plurality of n-gram fuzzy matches utilizing edit distance. Process 400 may be performed, for example, by fuzzy match comparator 206. As shown in FIG. 4, an input string 402 may be passed to n-gram parser 404. The input string may be one or more input strings in a UTF-8 format. N-gram parser 404 may parse the input string to generate a plurality of input string n-grams. The n-gram parser 404 may be generate n-grams of a length of n, n being an integer ranging from a lower bound to an upper bound equal to the length of the Input string. According to some examples, the lower and upper bound for n may be based on a Unicode range of a first character of the input string.

According to some examples, the entire string may be added to the plurality of n-grams as an n-gram when the string length is less than the lower indexing bound or when the string is an exact match with a stop word from a pre-configured stop word list.

According to some examples, the n-gram parser 404 may add prefixes and/or suffixes of the input string to the plurality of n-grams. The length of the prefix and/or suffix of the input string may be equal to the lowerbound −1.

According to some examples, n-gram parser 404 may parse the input string to add to the plurality of n-gram using the "-" character as a delimiter regardless of the value of the lower or upper bound of n.

According to some examples, the n-gram parser 404 may add the entire input string to the plurality of n-grams regardless of the value of the lower or upper bound of n.

Domain string 406 may be passed to n-gram parser 408. The domain string may be one or more domain strings in a UTF-8 format. N-gram parser 408 may parse the domain string to generate a plurality of domain string n-grams. The n-gram parser 408 may be generate n-grams of a length of n, n being an integer, from a lower bound to the length of the input string. According to some examples, the lower and upper bound for n may be based on a Unicode range of a first character of the domain string.

According to some examples, the entire string may be added to the plurality of n-grams as an n-gram when the string length is less than the lower Indexing bound or when the string is an exact match with a stop word from a pre-configured stop word list.

According to some examples, the n-gram parser 408 may add prefixes and/or suffixes of the domain string to the plurality of n-grams. The length of the prefix and/or suffix may be equal to the lowerbound −1.

According to some examples, n-gram parser 408 may parse the domain string to add to the plurality of n-grams using the "-" character as a delimiter regardless of the value of the lower or upper bound of n.

According to some examples, the n-gram parser 408 may add the entire input string to the plurality of n-grams regardless of the value of the lower or upper bound of n.

The plurality of n-grams generated by n-gram parser 408 may be passed to 410 where the system loops through each domain string n-gram. Each domain n-gram may be passed to 412 where the system loops through each input string n-gram. Each domain n-gram is compared to each input n-gram and an edit distance is calculated 414. A predefined edit distance factor is utilized to determine if the calculated edit distance is greater than or less than a predetermined edit distance factor. This comparison determines the degree of similarity between the two n-grams, where a small edit distance indicates a large degree of similarity and a larger edit distance indicates a smaller degree of similarity. If the edit distance is less than the edit distance factor (414, YES), indicating an acceptable degree of similarity between the domain n-gram and the input n-gram, then the matched domain name is stored 416. If the edit distance is greater than the edit distance factor (414, NO), then the domain string is discarded 418.

Process 400 proceeds to process n-grams as described until al of the generated domain n-grams are compared to all of the input string n-grams.

According to some examples, an alert may be generated, for example, by alert generator 216, the alert including the stored matched domain names and may be passed, for example, to an output device, to a remote device, etc.

FIG. 5 depicts pseudocode for generating a plurality of n-grams in accordance with some examples as discussed herein. The process depicted in FIG. 5 may be performed, for example, by n-gram parser 202.

As can be seen in FIG. 5, the process utilizes an input string, a stopword list, a lower bound, an upper bound, and an n-gram index (for example, a list or set of n-grams). The input string may be in various forms, for example, UTF format such as UTF-8, etc., ASCII, such as punycode, etc. The lower bound may be a numerical value representing a lower bound of the length of generated n-grams. The upper bound may be a numerical value representing an upper bound of the length of generated n-grams. The upper bound and lower bound may be set by default (e.g., on a per-language or per-Unicode-range basis), may be set via an interface by a user, etc.

As can be seen in FIG. 5, the TLD may be stripped from the input string. If the Input string is punycode, the punycode is converted to UTF format, such as UTF-8.

If the input string is in the stopword list, the entire input string is added to the n-gram index and the process is completed.

If the Input string is not in the stopword list, and if the length of the input string is less than the lower bound, the input string is added to the n-gram index and the process is completed. If the length of the input string is less than or equal to the upper bound, then the upper bound is set as the length of the input string. If the length of the input string is not less than or equal to (i.e., greater than) the upper bound, then the input string is added to the n-gram index. Further n-grams are indexed for the input string from the lower bound to the upper bound. For each n-gram, if the n-gram does not contain a "-", the n-gram is added to the n-gram index. Further, prefixes and suffixes for the input string are indexed where the length of the prefix of the input string is equal to the lower bound −1, and the length of the suffix is equal to the length of the input string—(lowerbound −1). If the input string Includes a "-", "-" is used as a delimiter where in the input string is split into multiple strings, for example, all characters before the "-" may be one substring, and all of the characters after the "-" may be another substring. Each of the substrings may be added to the n-gram index if they are not already in the n-gram index. The process is completed.

Figure 6:
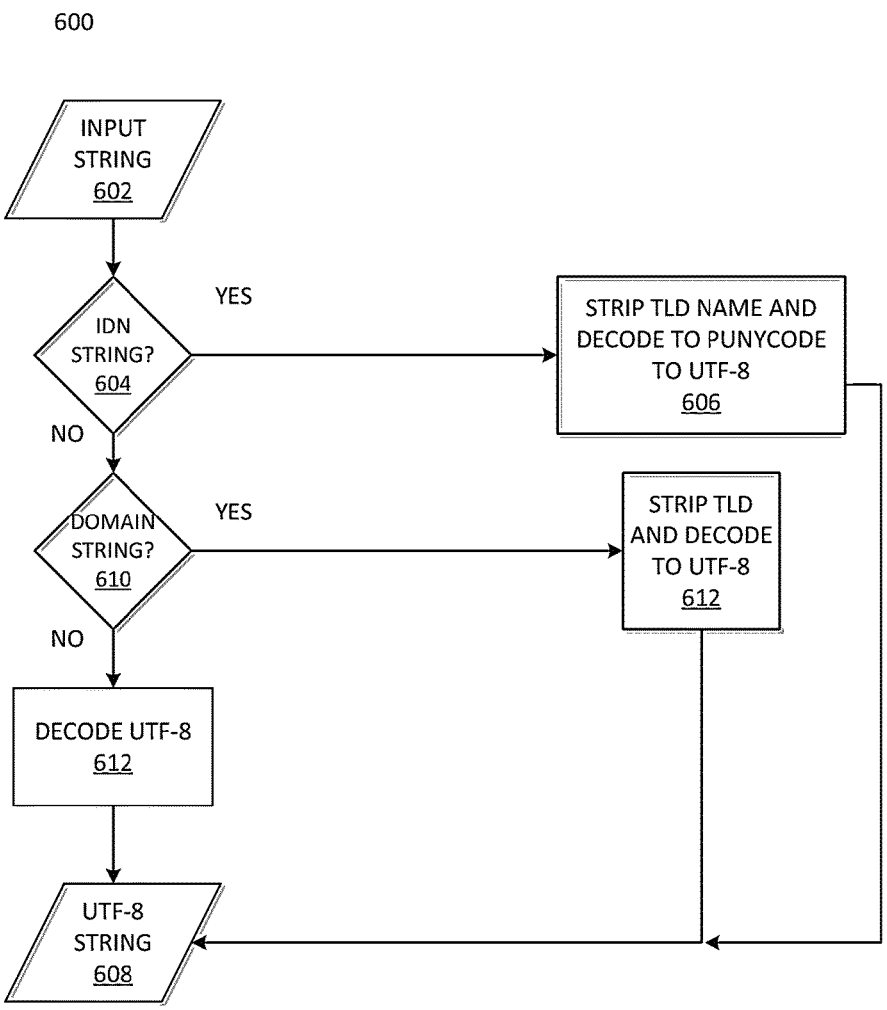
FIG. 6 is an example flow diagram of a process to generate a UTF-encoded string, in accordance with one or more examples as discussed herein.

FIG. 6 is a process 600 for generating a UTF-8 string according to some examples as discussed herein. Process 600 may be implemented by, for example, IDN processor 214. As shown in FIG. 6, input string 602 is provided. Input string 602 may be accessed, for example, by device 200 from a storage, from a client device, via a user interface, via a user interface at device 200, etc.

A determination is made whether the input string is an IDN 604. For example, it may be determined whether the input string has an "XN" prefix. If the input string has an "XN" prefix, the string may be an IDN domain. If not, then the string is not an IDN domain. If it is determined that the input string is an IDN (604, YES), then the TLD name is stripped from the IDN input string and the punycode for the remainder is decoded to a UTF-8 string 606. The UTF-8 string is then output. If the input string Is not an IDN (604, NO), then processing proceeds to 610.

At 610, a determination is made whether the input string is a domain string. For example, it may be determined if the Input string is a non-IDN, ASCII domain. If the input string is a domain string (610, YES), then the TLD is stripped from the input string and the remainder of the input string is converted to UTF-8 612. The UTF-8 string is then output 608. If the input string is not a domain string (610, NO), then processing proceeds to 612.

At 612, the Input string is decoded to UTF-8. The UTF-8 string is then output 608.

According to some examples, the UTF-8 string 608 is utilized as the input string and/or the domain that is input to n-gram parsers as more fully discussed herein.

Figure 7:
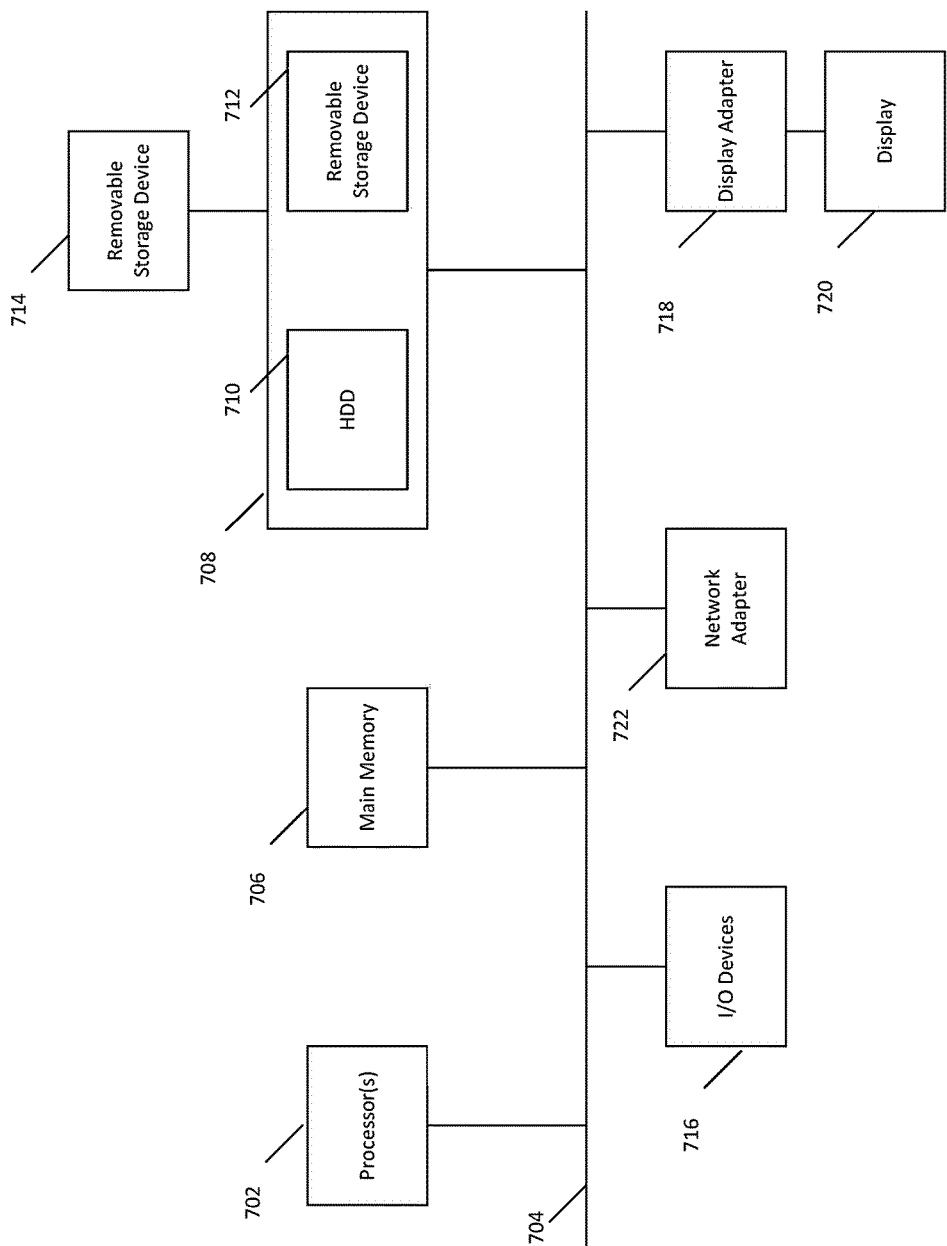
FIG. 7 is an example computer system or apparatus that may be used as a platform for executing the functionality discussed herein.

FIG. 7 illustrates a block diagram of a computing apparatus 700, such as the device 200 depicted in FIG. 2, according to an example. In this respect, the computing apparatus 700 may be used as a platform for executing one or more of the functions described hereinabove.

The computing apparatus 700 includes one or more processors 702, such as the processor(s) 212. The processor(s) 702 may be used to execute some or all of the steps, operations and functions described in the processes, methods and systems depicted in FIGS. 3-6. Commands and data from the processor(s) 702 are communicated over a communication bus 704. The computing apparatus 700 also includes a main memory 706, such as a random access memory (RAM), where the program code for the processor(s) 702 may be executed during runtime, and a secondary memory 708. The secondary memory 708 may includes, for example, one or more hard disk drives 710 and/or a removable storage drive 712, representing a floppy diskette drive, a magnetic tape drive, a compact disk drive, etc., where a copy of the program code for the methods and processes discussed in FIGS. 3-6 may be stored.

The removable storage drive 710 may read from and/or write to a removable storage unit 714 in a well-known manner. User input and output devices 716 may Include a keyboard, a mouse, a display, etc. A display adaptor 718 may interface with the communication bus 704 and the display 720 and may receive display data from the processor(s) 702 and convert the display data into display commands for the display 720. In addition, the processor(s) 702 may communicate over a network, for Instance, the Internet, LAN, etc., through a network adaptor 722.

Figure 8:
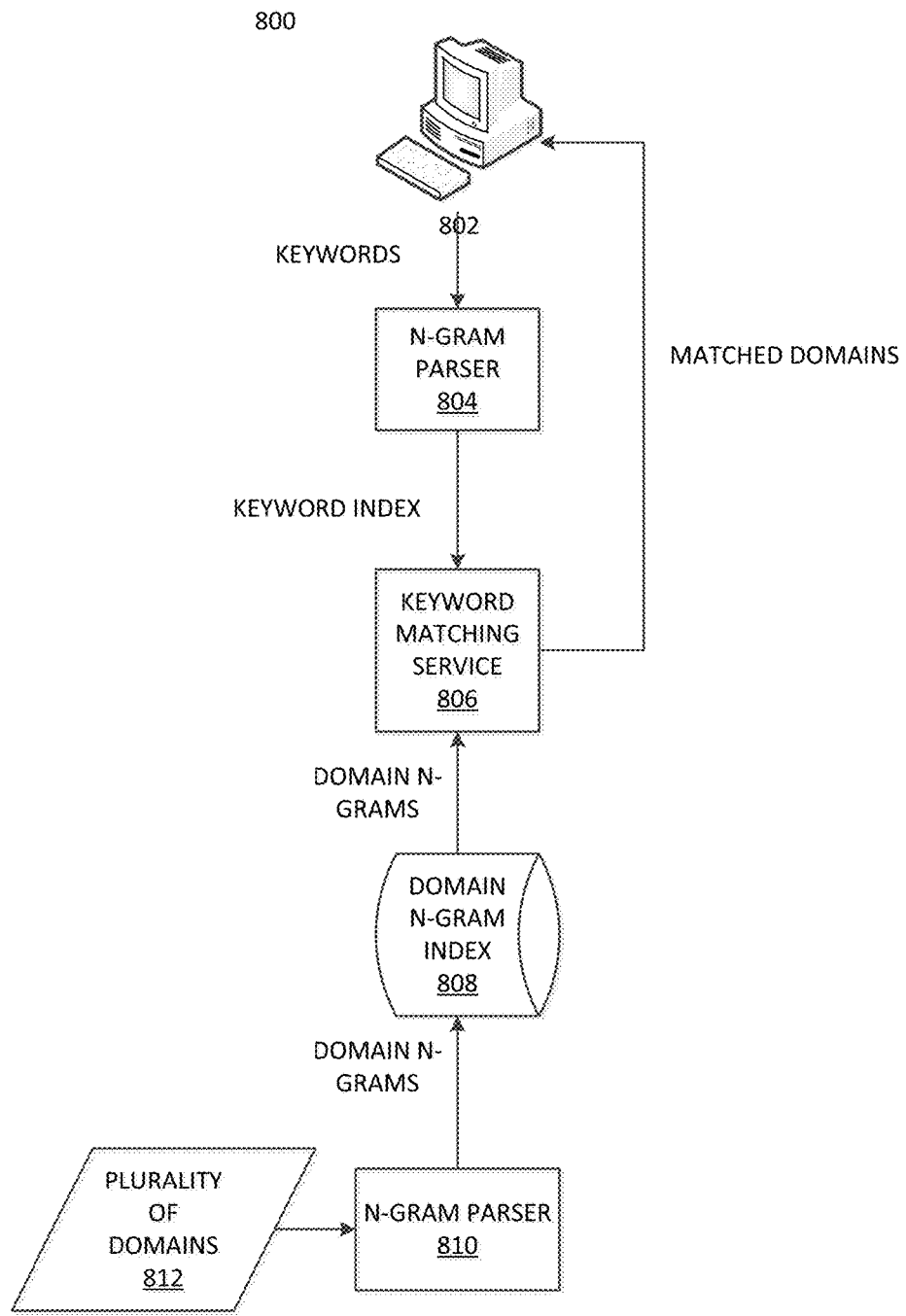
FIG. 8 is an example flow of a domain search web service, in accordance with one or more examples as discussed herein.

FIG. 8 depicts a system 800, in accordance with some examples as discussed herein, wherein a multi-lingual keyword matching service may be used to implement a domain search web service, where a pre-existing set of domains are Indexed and users can enter search terms, as input strings, and receive a set of matching domains. In accordance with some examples, device 200 may receive a whitespace-separated set of keywords via HTTP or similar protocol from client device 802. The keywords may be indexed, or parsed, using an n-gram parser 804, thereby producing a keyword index, or a plurality of keyword n-grams. Keyword matching service 806 matches the plurality of n-grams of the keywords, I.e., the plurality of input string n-grams as discussed above, with a preexisting domain n-gram index 808 or domain n-gram set, producing one or more matched domains. The matched domains are returned, for example, to a display at a client device, via HTTP, in one of the following formats: HTML, XML, RSS, or JSON. On the backend, the domain n-gram index 808 is periodically refreshed by running a set of domains 812 through the n-gram parser 810 and storing the resulting domain n-grams in the domain n-gram index 808.

Figure 9:
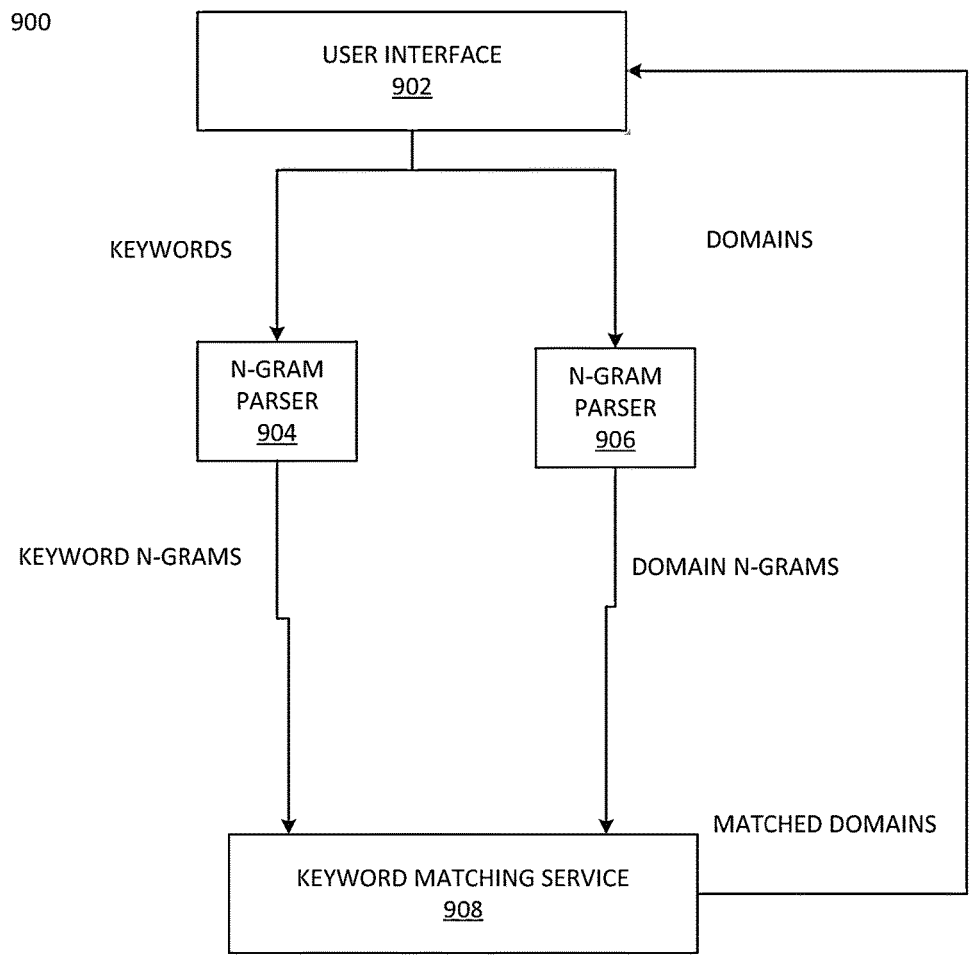
FIG. 9 is an example flow of a keyword matching web service, in accordance with one or more examples as discussed herein.

FIG. 9 depicts a system 900, in accordance with some examples as discussed herein, wherein a multi-lingual keyword matching service may be implemented as a web service. As shown in FIG. 9, a user interface 902 may receive keyword(s) and domain(s). A keyword matching service 908 returns one or more matching domains and the specific keywords they match to the user interface 902.

As shown in FIG. 9, a request may be received via HTTP at user interface 902 including a set of keywords and a set of domains. Both the keywords and the domains are processed via an n-gram parser 904 and 906, respectively, creating both a plurality of keyword n-grams and a plurality of domain n-grams. It may be appreciated that n-gram parser 904 may be implemented as two n-gram parsers, as shown, as a single n-gram parser, may be implemented within keyword matching service 908, etc.

Keyword matching service 908 matches domains to keywords, as more fully discussed above, and returns results to the user interface as HTML, XML, RSS, or JSON.

Figure 10:
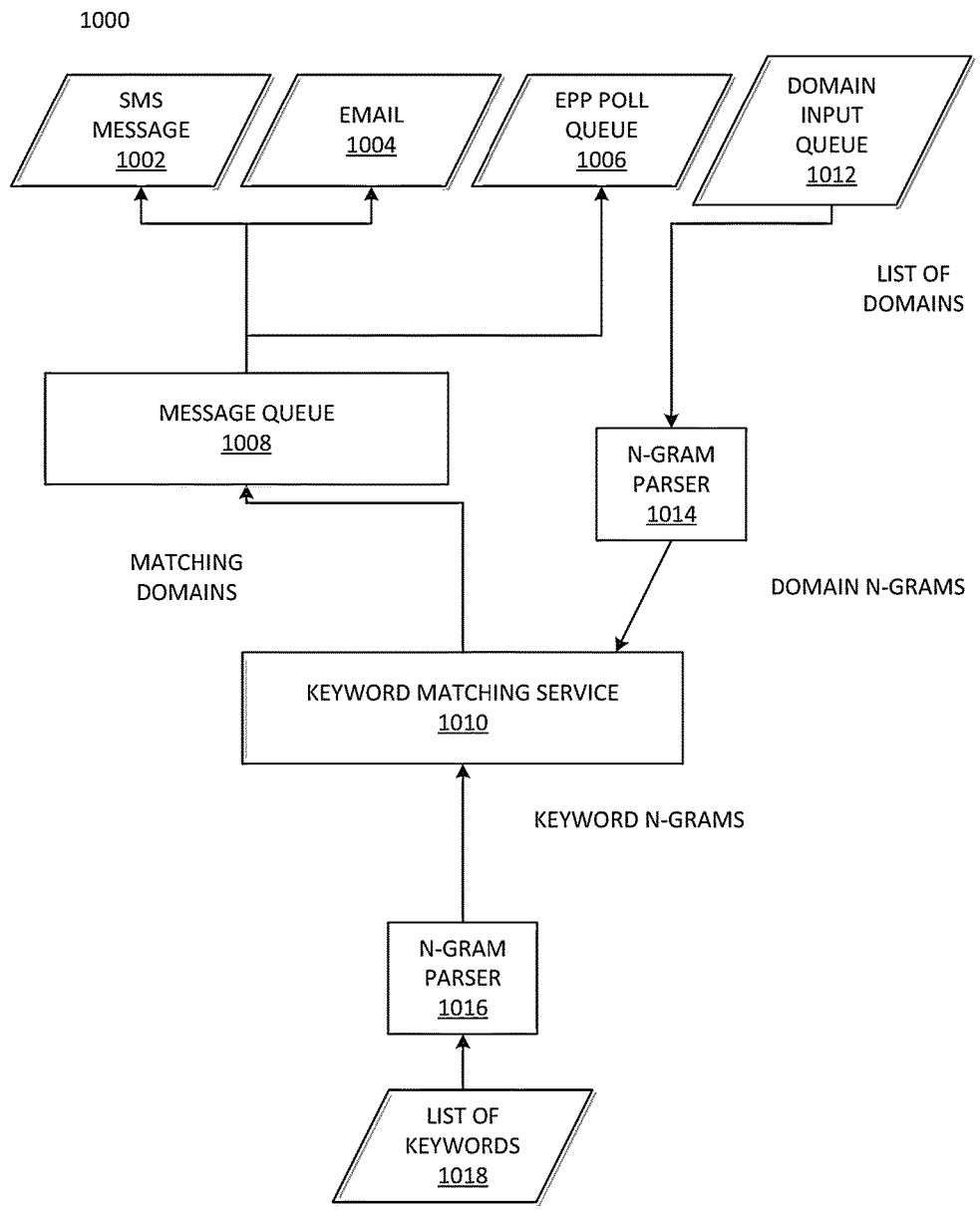
FIG. 10 is an example flow of a monitoring and notification service, in accordance with one or more examples as discussed herein.

FIG. 10 depicts a system 1000, in accordance with some examples as discussed herein, wherein a multi-lingual keyword matching service is implemented as a batch process/daemon for the purposes of monitoring a domain name input stream (e.g., NXD data, pending delete domains, etc.) given a set of keywords (e.g., brand trademarks, etc.). As shown in FIG. 10, keyword matching service 1010 runs continuously as a daemon or on a schedule as a chronological job.

Keyword matching service 1010 receives a plurality of keyword n-grams, generated by the n-gram parser 1016 from a pre-configured set of keywords 1018, and a plurality of domain n-grams, generated by the n-gram parser 1014 from a domain input stream 1012.

Keyword matching service 1010 determines one or more matching domains and writes the one or more matching domains to a message queue 1008. The message queue 1008 disseminates the one or more matching domains, for example, via SMS message 1002, email 1004, EPP poll message 1006, or other channels of communication (not shown).

The following is an example of an input strings processed by the functionality discussed with regard to FIG. 5.

Example 1: Input String:
POWERED-BY-VERISIGN.COM

Lowerbound: 3
Upperbound: 15
Input string after stripping out TLD: POWERED-BY-VERISIGN
Upperbound after accounting for input string size: 15
Index ngrams for POWERED-BY-VERISIGN, skipping those that contain a dash.
　Adding POW to Index.
　Adding OWE to index.
　Adding WER to index.
　Adding ERE to Index.
　Adding RED to index.
　Adding VER to Index.
　Adding ERI to Index.
　Adding RIS to index.
　Adding ISI to index.
　Adding SIG to index.
　Adding IGN to index.
　Adding POWE to index.
　Adding OWER to Index.
　Adding WERE to index.
　Adding ERED to index.
　Adding VERI to index.
　Adding ERIS to index.
　Adding RISI to index.
　Adding ISIG to index.
　Adding SIGN to index.
　Adding POWER to index.
　Adding OWERE to index.
　Adding WERED to Index.
　Adding VERIS to index.
　Adding ERISI to index.
　Adding RISIG to index.
　Adding ISIGN to index.
　Adding POWERE to index.
　Adding OWERED to index.
　Adding VERISI to index.
　Adding ERISIG to index.
　Adding RISIGN to index.
　Adding POWERED to index.
　Adding VERISIG to index.
　Adding ERISIGN to Index.
　Adding VERISIGN to index.
Add entire string to index if Upperbound is less than the length of the input string:
　Adding POWERED-BY-VERISIGN to index.
Index prefixes and suffixes where lower bound −1
　Adding PO to index.
　Adding GN to Index.
Split string by '-' and add gram to index only if not already present in Index
　Adding BY to Index.

Example 2: Input String: AND.COM

Lowerbound: 3
Upperbound: 15
Input string after stripping out TLD: AND
Upperbound after accounting for input string size: 3

If input string is a stopword or less than the lower bound, then add entire string to index and exit:
　　Adding AND to index.

Example 3: Input String: XY.COM

Lowerbound: 3
Upperbound: 15
Input string after stripping out TLD: XY
Upperbound after accounting for input string size: 2
If input string is a stopword or less than the lower bound, then add entire string to index and exit:
　　Adding XY to Index.

Example 4: Input String: MYVERISIGNTV.TV

Lowerbound: 3
Upperbound: 15
Input string after stripping out TLD: MYVERISIGNTV
Upperbound after accounting for input string size: 12
Index ngrams for MYVERISIGNTV, skipping those that contain a dash.
　　Adding MYV to Index.
　　Adding YVE to Index.
　　Adding VER to index.
　　Adding ERI to Index.
　　Adding RIS to index.
　　Adding ISI to index.
　　Adding SIG to Index.
　　Adding IGN to Index.
　　Adding GNT to index.
　　Adding NTV to index.
　　Adding MYVE to index.
　　Adding YVER to index.
　　Adding VERI to Index.
　　Adding ERIS to Index.
　　Adding RISI to index.
　　Adding ISIG to Index.
　　Adding SIGN to index.
　　Adding IGNT to index.
　　Adding GNTV to Index.
　　Adding MYVER to Index.
　　Adding YVERI to index.
　　Adding VERIS to index.
　　Adding ERISI to Index.
　　Adding RISIG to index.
　　Adding ISIGN to Index.
　　Adding SIGNT to index.
　　Adding IGNTV to index.
　　Adding MYVERI to index.
　　Adding YVERIS to index.
　　Adding VERISI to index.
　　Adding ERISIG to Index.
　　Adding RISIGN to Index.
　　Adding ISIGNT to index.
　　Adding SIGNTV to index.
　　Adding MYVERIS to index.
　　Adding YVERISI to index.
　　Adding VERISIG to index.
　　Adding ERISIGN to index.
　　Adding RISIGNT to index.
　　Adding ISIGNTV to Index.
　　Adding MYVERISI to index.
　　Adding YVERISIG to Index.
　　Adding VERISIGN to Index.
　　Adding ERISIGNT to index.
　　Adding RISIGNTV to index.
　　Adding MYVERISIG to index.
　　Adding YVERISIGN to index.
　　Adding VERISIGNT to index.
　　Adding ERISIGNTV to index.
　　Adding MYVERISIGN to index.
　　Adding YVERISIGNT to index.
　　Adding VERISIGNTV to index.
　　Adding MYVERISIGNT to Index.
　　Adding YVERISIGNTV to index.
　　Adding MYVERISIGNTV to index.
Index prefixes and suffixes where lower bound −1
　　Adding MY to index.
　　Adding TV to index.
Split string by '-' and add gram to Index only if not already present in index:
　　No dashes found

Example 5: Input String: SHORT-NAME.CC

Lowerbound: 3
Upperbound): 16
Input string after stripping out TLD: SHORT-NAME
Upperbound after accounting for input string size: 10
Index ngrams for SHORT-NAME, skipping those that contain a dash.
　　Adding SHO to index.
　　Adding HOR to Index.
　　Adding ORT to index.
　　Adding NAM to index.
　　Adding AME to Index.
　　Adding SHOR to Index.
　　Adding HORT to Index.
　　Adding NAME to index.
　　Adding SHORT to index.
Index prefixes and suffixes where lower bound −1
　　Adding SH to index.
　　Adding ME to index.
Split string by '-' and add gram to index only if not already present in index
　　SHORT and NAME have already been added-no need to add a second time
Always make sure entire string is added to Index regardless of circumstances:
　　Adding SHORT-NAME to index.

Example 6: Input String: XN-PCKPZO4A2F8ETH.TV

Lowerbound: 3
Upperbound: 15
Input string after stripping out TLD and converting punycode to UTF-8: ショップドクタ-
Upperbound after accounting for input string size: 8
Index ngrams for ショップドクタ-, skipping those that contain a dash.
　　Adding ショッ to index.
　　Adding ョップ to Index.
　　Aiding ップド to index.
　　Adding プドク to index.
　　Adding ドクタ to index.
　　Adding クタ- to index.
　　Adding ショップ to index.
　　Adding ョップド to index.
　　Adding ップドク to index.
　　Adding プドクタ to index.
　　Adding ドクタ- to index.

Adding ショップド to index.
Adding ョップドク to index.
Adding ップドクタ to index.
Adding プドクタ - to index.
Adding ショップドク to index.

Adding ョップドクタ to index.
Adding ップドクタ - to index.
Adding ショップドクタ to index.

Adding ョップドクタ - to index.

Adding ショップドクタ - to index.
Index prefixes and suffixes where lower bound −1:
Adding シヨ to index.
Adding タ - to index.
Split string by '-' and add gram to index only if not already present in Index:
No dashes found The following is what the entire inverted n-gram index looks like after the aforementioned examples have been indexed (format [gram]=[domain1][domain2][etc.]):
YVE=MYVERISIGNTV.TV
ERIS=POWERED-BY-VERISIGN.COM MYVERISIGNTV.TV
NAM=SHORT-NAME.CC
ップドク F=XN-PCKPZO4A2F8ETH.TV
SIG=POWERED-BY-VERISIGN.COM MYVERISIGNT-V.TV
ERISI=POWERED-BY-VERISIGN.COM MYVERISIGNTV.TV
WERED=POWERED-BY-VERISIGN.COM
BY=POWERED-BY-VERISIGN.COM
YVERI=MYVERISIGNTV.TV
POWER=POWERED-BY-VERISIGN.COM
ショップドク =XN-PCKPZO4A2F8ETH.TV
RIS=POWERED-BY-VERISIGN.COM MYVERISIGNT-V.TV
MYV=MYVERISIGNTV.TV
ISIGNTV=MYVERISIGNTV.TV
MYVERIS=MYVERISIGNTV.TV
ョップ=XN -PCKPZO4A2F8ETH.TV
RISI=POWERED-BY-VERISIGN.COM MYVERISIGNT-V.TV
SIGN=POWERED-BY-VERISIGN.COM MYVERISIGNTV.TV
WER=POWERED-BY-VERISIGN.COM
VERISIG=POWERED-BY-VERISIGN.COM MYVERISIGNTV.TV
ョップドクタ -=XN-PCKPZO4A2F8ETH.TV
GN=POWERED-BY-VERISIGN.COM
VERISI=POWERED-BY-VERISIGN.COM MYVERISIGNTV.TV
POWERED=BY-VERISIGN-POWERED-BY-VERISIGN-.COM
MYVERISIGN=MYVERISIGNTV.TV
RISIGNTV=MYVERISIGNTV.TV
シヨ= XN-PCKPZO4A2F8ETH.TV
SHORT=SHORT-NAME.CC
ショップドクタ -=XN-PCKPZO4A2F8ETH.TV
RISIGN=POWERED-BY-VERISIGN.COM MYVERISIGNTV.TV
ョップドク =XN-PCKPZO4A2F8ETH.TV
YVERISI=MYVERISIGNTV.TV
PO=POWERED-BY-VERISIGN.COM
RISIGNT=MYVERISIGNTV.TV
VERIS=POWERED-BY-VERISIGN.COM MYVERISIGNTV.TV
ショップド =XN-PCKPZO4A2F8ETH.TV
ショッ =XN-PCKPZO4A2F8ETH.TV
ョップド =XN-PCKPZO4A2F8ETH.TV
ISIGN=POWERED-BY-VERISIGN.COM MYVERISIGNTV.TV
IGN=POWERED-BY-VERISIGN.COM MYVERISIGNT-V.TV
IGNTV=MYVERISIGNTV.TV
AND=AND.COM
MYVERISIG=MYVERISIGNTV.TV
OWERED=POWERED-BY-VERISIGN.COM
ERISIG=POWERED-BY-VERISIGN.COM MYVERISIGNTV.TV
MYVER=MYVERISIGNTV.TV
MY=MYVERISIGNTV.TV
SHORT=NAME-SHORT-NAME.CC
POWERED=POWERED-BY-VERISIGN.COM
ERISIGNT=MYVERISIGNTV.TV
ISI=POWERED-BY-VERISIGN.COM MYVERISIGNT-V.TV
タ -=XN-PCKZO4A2F8ETH.TV
HORT=SHORT-NAME.CC
RED=POWERED-BY-VERISIGN.COM
YVER=MYVERISIGNTV.TV
ISIG=POWERED-BY-VERISIGN.COM MYVERISIGNT-V.TV
YVERISIGNTV=MYVERISIGNTV.TV
YVERISIG=MYVERISIGNTV.TV
OWERE=POWERED-BY-VERISIGN.COM
ショップドクタ =XN-PCKPZO4A2F8ETH.TV
POWE=POWERED-BY-VERISIGN.COM
ME=SHORT-NAM E.CC
YVERISIGNT=MYVERISIGNTV.TV
ップドクタ -=XN-PCKPZO4A2F8ETH.TV
SIGNTV=MYVERISIGNTV.TV
ップド =XN-PCKPZO4A2F8ETH.TV
ドクタ -=XN-PCKPZO4A2F8ETH.TV
XY=XY.COM
ERISIGN=POWERED-BY-VERISIGN.COM MYVERISIGNTV.TV
ショップ =XN-PCKPZO4A2F8ETH.TV
IGNT=MYVERISIGNTV.TV
NAME=SHORT-NAME.CC
POWERE=POWERED-BY-VERISIGN.COM
NTV=MYVERISIGNTV.TV
SH=SHORT-NAME.CC
ERED=POWERED-BY-VERISIGN.COM
ップドクタ =XN-PCKPZO4A2F8ETH.TV
GNT=MYVERISIGNTV.TV
ブドク=XN-PCKPZO4A2F8ETH.TV
ERE=POWERED-BY-VERISKGN.COM
ERISIGNTV=MYVERISIGNTV.TV
OWER=POWERED-BY-VERISIGN.COM
GNTV=MYVERISIGNTV.TV
ドクタ =XN-PCKPZO4A2F8ETH.TV
OWE=POWERED-BY-VERISIGN.COM
POW=POWERED-BY-VERISIGN.COM
ERI=POWERED-BY-VERISIGN.COM MYVERISIGNT-V.TV
MYVERISI=MWVERISIGNTV.TV
SHOR=SHORT-NAME.CC
MYVE=MYVERISIGNTV.TV RISIG=POWERED-BY-VERISIGN.COM
MYVERISIGNTV.TV
HOR=SHORTNAME.CC
YVERISIGN=MYVERISIGNTV.TV
VERI=POWERED-BY-VERISIGN.COM
MYVERISIGNTV.TV
プドクタ=XN-PCKPZO4A2F8ETH.TV
VERISIGNTV=MYVERISIGNTV.TV
プドクタ-=XN-PCKPZO4A2F8ETH.TV
MYVERISIGNTV=MYVERISIGNTV.TV
SIGNT=MYVERISIGNTV.TV
TV=MYVERISIGNTV.TV
MYVERISIGNTV=MYVERISIGNTV.TV
クタ-=XN-PCKPZO4A2F8ETH.TV
VERISIGNT=MYVERISIGNTV.TV
YVERIS=MYVERISIGNTV.TV
MYVERI=MYVERISIGNTV.TV
ョップドクタ=XN-PCKPZO4A2F8ETH.TV
VERISIGN=POWERED-BY-VERISIGN.COM
MYVERISIGNTV.TV The following is an example of a Simple Exact Match Search Scenario utilizing the Index created in the six examples set forth above. The process for performing the exact match search is discussed, for example, in FIG. 3:
1. Search string: "Verisign Power"
2. Parse search string on white space (optionally, you can parse search string as n-grams).
3. "Verisign" matches two domains:
   POWERED-BY-VERISIGN.COM
   MYVERISIGNTV.TV
4. "Power" matches one domain:
   POWERED-BY-VERISIGN.COM
5. Search engine returns the following two results:
   POWERED-BY-VERISIGN.COM: Relevance score=2.56
      Two search terms matched+(13/23)=2.56
   MYVERISIGNTV.TV: Relevance score=1.53
      One search term matched+(8/15)=1.53

Other embodiments of the Invention will be apparent to those skilled in the art from consideration of the specification and practice of the invention disclosed herein. It is Intended that the specification and examples be considered as exemplary only, with a true scope and spirit of the invention being indicated by the following claims.

It may be appreciated that other encodings may be used, for example, UTF-16, UTF-32, other encodings that support Unicode, etc.

What is claimed is:

1. A computer-implemented method, comprising:
   accessing a first input string that includes a keyword to be compared;
   generating a Universal character set transformation format (UTF)-encoded input string from the first input string;
   parsing the UTF-encoded input string via an n-gram parser to generate a plurality of input string n-grams;
   accessing a second input string that includes a domain to be compared;
   determining that the second input string includes a top-level domain suffix;
   stripping the top-level domain suffix from the second input string to create a modified second input string;
   generating a UTF-encoded domain string from the modified second input string that includes the domain;
   parsing the UTF-encoded domain string to generate a plurality of domain string n-grams from the UTF-encoded domain string;
   comparing the plurality of input string n-grams to the plurality of domain string n-grams;
   identifying a match between the first input string that includes the keyword and the second input string that includes the domain based on the comparison of the plurality of input string n-grams to the plurality of domain string n-grams;
   generating a relevance score for the identified match, wherein the relevance score is based on a first input string n-gram from the plurality of input string n-grams that match the plurality of domain string n-grams; and
   returning the second input string that includes a domain based on determining that the relevance score meets a threshold value and one or more variants of the domain that include one or more graphemes that are different from one or more graphemes in the domain.

2. The computer-implemented method of claim 1, wherein comparing the plurality of input string n-grams to the plurality of domain string n-grams comprises:
   comparing the plurality of input string n-grams to the plurality of domain string n-grams to identify one or more fuzzy matches.

3. The computer-implemented method of claim 1, wherein comparing the plurality of input string n-grams to the plurality of domain string n-grams comprises:
   comparing the plurality of input string n-grams to the plurality of domain string n-grams to identify one or more exact matches.

4. The computer-implemented method of claim 1, wherein parsing the UTF-encoded input string via an n-gram parser includes:
   splitting the UTF-encoded input string into a plurality of n-grams having a length between an upper bound and a lower bound.

5. The computer-implemented method of claim 1, further comprising:
   determining that the second input string is a punycode string; and
   decoding the punycode string.

6. The computer-implemented method of claim 1, wherein n is an integer having a lower bound and an upper bound that is based on a Unicode range of a first character of the first input string.

7. The computer-implemented method of claim 6, wherein the first input string is added to the plurality of input string n-grams when the length of the first input string is less than the lower bound.

8. The computer-implemented method of claim 6, wherein the first input string is added to the plurality of n-grams regardless of the lower bound and the upper bound.

9. The computer-implemented method of claim 6, further comprising:
   extracting a prefix from the first input string, the prefix having a length of the lower bound −1;
   extracting a suffix from the first input string, the suffix having a length of the lower bound −1; and
   adding the prefix and the suffix to the plurality of input string n-grams.

10. The computer-implemented method of claim 1, wherein parsing the UTF-encoded input string further comprises:
    determining that the first input string includes a dash; and
    adding all characters before the dash and all the characters after the dash to the plurality of n-grams.

11. A computer-implemented method, comprising:
accessing an input string;
determining that the input string includes a top-level domain suffix;
stripping the top-level domain suffix from the input string to create a modified input string;
generating a Universal character set transformation format (UTF)-encoded input string from the modified input string;
generating, via an n-gram parser, a plurality of input string n-grams from the UTF-encoded input string, a length of each of the input string n-grams being larger than a lower bound and smaller than an upper bound;
providing the plurality of input string n-grams to compare with a plurality of domain string n-grams;
generating a relevance score for an identified match between one of the plurality of input strings n-grams and one of the plurality of domain string n-grams, wherein the relevance score is based on a number of input string n-grams from the plurality of input string n-grams that match the plurality of domain string n-grams;
receiving an indication of a matched domain name determined based on the relevance score; and
providing the matched domain name and one or more variants of the matched domain name that include one or more graphemes that are different from one or more graphemes in the matched domain name.

12. The method of claim 11, wherein the upper bound is the length of the input string.

13. The computer-implemented method of claim 11, further comprising:
determining that the input string is a punycode string; and
decoding the punycode string.

14. The computer-implemented method of claim 11, wherein the lower bound and the upper bound are based on a Unicode range of a first character of the input string.

15. The computer-implemented method of claim 14, wherein the input string is added to the plurality of input string n-grams when the length of the input string is less than the lower bound.

16. The computer-implemented method of claim 14, wherein the input string is added to the plurality of n-grams regardless of the upper bound and the lower bound.

17. The computer-implemented method of claim 14, further comprising:
extracting a prefix from the input string, the prefix having a length of the lower bound −1;
extracting a suffix from the input string, the suffix having a length of the lower bound −1; and
adding the prefix and the suffix to the plurality of input string n-grams.

18. The computer-implemented method of claim 11, wherein parsing the UTF-encoded input string further comprises:
determining that the input string includes a dash; and
adding all characters before the dash and all the characters after the dash to the plurality of n-grams.

19. A computer-implemented method, comprising:
receiving a domain name input stream including a plurality of domain names;
for each domain name in the domain name input stream, determining that each domain name includes a top-level domain suffix; stripping the top-level domain suffix from the domain name to create a modified domain name; and generating a Universal character set transformation format (UTF)-encoded domain string based on the modified domain name;
for each UTF-encoded domain string, parsing the UTF-encoded domain string to generate a plurality of domain string n-grams;
accessing a plurality of input string n-grams generated from a UTF-encoded input string;
comparing the plurality of input string n-grams to each of the plurality of domain string n-grams;
identifying a match between the UTF-encoded input string and at least one of the UTF-encoded domain strings based on the comparison of the plurality of input string n-grams to the plurality of domain string n-grams; and
generating an alert including the match and one or more variants of the match that includes one or more graphemes that are different from one or more graphemes in the match.

20. The computer-implemented method of claim 19, wherein comparing the plurality of input string n-grams to each of the plurality of domain string n-grams comprises:
comparing the plurality of input string n-grams to the plurality of domain string n-grams to identify one or more fuzzy matches.

21. The computer-implemented method of claim 19, wherein comparing the plurality of input string n-grams to each of the plurality of domain string n-grams comprises:
comparing the plurality of input string n-grams to each of the plurality of domain string n-grams to identify one or more exact matches.

22. The computer-implemented method of claim 19, wherein n is an integer having a lower bound and an upper bound that is based on a Unicode range of a first character of a domain name.

23. The computer-implemented method of claim 22, wherein the domain name is added to the plurality of domain string n-grams when the length of the UTF-encoded input string is less than the lower bound.

24. The computer-implemented method of claim 22, wherein the domain name is added to the plurality of domain string n-grams regardless of the lower bound and the upper bound.

25. The computer-implemented method of claim 22, further comprising:
extracting a prefix from each domain name in the domain name input stream, the prefix having a length of the lower bound −1;
extracting a suffix from each domain name in the domain name input stream, the suffix having a length of the lower bound −1; and
adding the prefix and the suffix to the plurality of domain string n-grams.

26. The computer-implemented method of claim 19, wherein parsing the UTF-encoded input string further comprises:
determining that the UTF-encoded input string includes a dash; and
adding all characters before the dash and all the characters after the dash to the plurality of input string n-grams.

* * * * *